July 19, 1960

K. A. REES ET AL 2,945,799

CATALYTIC CONVERION OF HYDROCARBONS
WITH REMOVAL OF FOULED MATERIAL
FROM HEAT EXCHANGERS

Filed May 10, 1956

Kenneth A. Rees
John J. Pastorek
Leonard M. Williams
Charles B. Herman

Inventors

By *George J. Siebay* Attorney

United States Patent Office 2,945,799
Patented July 19, 1960

2,945,799
CATALYTIC CONVERSION OF HYDROCARBONS WITH REMOVAL OF FOULED MATERIAL FROM HEAT EXCHANGERS

Kenneth A. Rees, John Joseph Pastorek, and Leonard Milton Williams, Baton Rouge, La., and Charles B. Herman, Madison, N.J., assignors to Esso Research and Engineering Company, a corporation of Delaware Filed May 10, 1956, Ser. No. 584,069

11 Claims. (Cl. 208—48)

This invention relates to catalytic reforming and more particularly relates to maintaining vapor heat exchangers free of undesired deposits.

In the catalytic reforming or hydroforming of naphtha stocks to make high octane gasoline it is usual practice to recover heat from the reformed vapors leaving the reactor by providing indirect heat exchange between the naphtha feed and/or the hydrogen-containing gas. In one hydroforming process using such heat exchange there has been fouling of certain of the heat exchangers. Various methods of cleaning deposits from the heat exchange tubes have been suggested but they have been found unsuitable for vapor heat exchangers. While the present invention will be specifically described in connection with powdered catalyst or fluid hydroforming, the invention is not to be restricted thereto, as the invention may be used in other reforming processes where hot reformed vaporous products leaving the reactor are indirectly heat exchanged with naphtha feed or hydrogen-containing gas or other hydroforming processes where catalyst dust is carried overhead with the hydroformate vapors which are passed through heat exchangers in indirect contact with naphtha feed and/or recycle gas or hydrogen-containing gas.

In one case where the plurality of heat exchangers were used it was found that poor heat exchange and higher pressure drops occurred in the cooler or last stage heat exchangers. This was apparently due to fouling of the heat exchange tubes by materials in the hydroformate vapors. It was found that introducing a solvent liquid or wash liquid into the hydroformate vapors just before the last stage heat exchangers removed the fouling material and the heat exchange was improved. The preferred solvent is relatively high boiling polymer recovered in the hydroforming process and a sufficient amount of the polymer is used to lower the temperature of the heat exchanger to be treated to such a level that the polymer contacts the fouling material in liquid form. The fouling material in the tubes of the heat exchanger is loosened or softened and blown out of the heat exchanger by the hydroformate vapors and gases passing through the heat exchanger. The treatment with the solvent liquid is done intermittently as required without stopping the hydroforming process.

Other solvent liquids may be used but the polymer liquid is preferred because it has a high aromatic content and has a good solvent action for the materials fouling the tubes. In addition, the polymer liquid does not put any extra load on the fractionating equipment used for stabilizing the unstabilized hydroformate. One of the less suitable but operable solvents which may be used is a part of the unstabilized hydroformate or fresh naphtha feed, both of which put an extra load on the fractionating equipment. The naphtha feed also contaminates the final hydroformate product. Also the polymer does not contaminate the hydroformate product.

Figure 1:
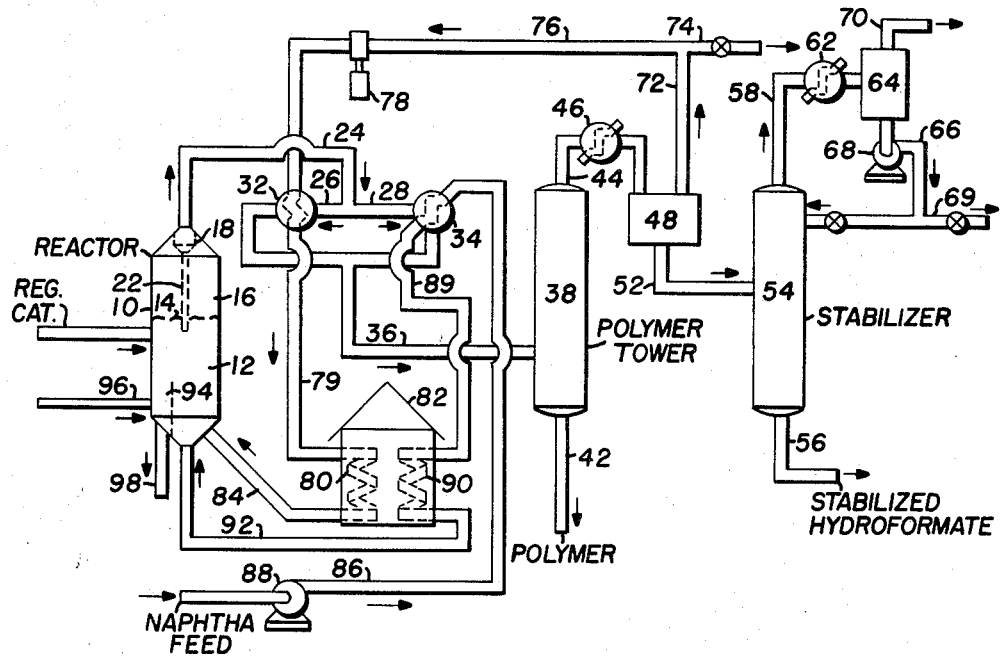
Fig. 1 represents a diagrammatic line drawing of a hydroforming unit.

Referring now to Fig. 1 of the drawing, the reference character 10 designates a vertical cylindrical reactor for maintaining a fluid bed 12 of hydroforming catalyst having a level indicated at 14 with a disperse phase 16 thereabove. The reactor is maintained at a temperature between about 850° and 1000° F. and a superatmospheric pressure between about 150 and 1000 p.s.i.g. About 2000 to 5000 cubic feet of hydrogen/bbl. of feed are passed through the reactor 10. Where recycle hydrogen-containing gas is used, the amount of gas is higher because of the lower concentration of hydrogen and where, for example, the recycle gas contains about 55–75% by volume of hydrogen, about 2000 to 6500 cubic feet of recycle gas/bbl. of feed are used. It is preferable to separately introduce the naphtha feed and recycle hydrogen-containing gas and to heat the hydrogen-containing gas to a higher temperature than the naphtha feed to avoid thermal cracking of the naphtha feed before it contacts the catalyst. The heated hydrogen-containing gas supplies some of the heat to the reactor.

The catalyst is a conventional hydroforming catalyst such as molybdenum oxide on alumina or alumina containing a small amount of silica, say up to 5% by weight. Other group VI metal oxides on a suitable carrier may be used. Used silica-alumina cracking catalyst may be used as a carrier or support. When using molybdenum oxide, about 5 to 15% by weight, preferably 10% by weight is used on alumina. The catalyst is preferably of an average size between about 20 and 80 microns with some particles being above and below this limit. The superficial velocity of the naphtha vapors and hydrogen-containing gas flowing upwardly in reactor 10 is between about 0.7 and 1.2 feet per second to produce a dense turbulent fluidized bed 12 of catalyst. The catalyst to naphtha liquid ratio may be between about .3 and 2.5 parts of catalyst to oil by weight. The weight of naphtha per hour per weight of catalyst in the reactor 10 may be between about .25 and 1.1.

The hydroformate or reformed vapors and hydrogen-containing gas containing entrained catalyst are passed through the dilute phase 16 in the reactor 10 and passed into a dust separator such as a cyclone separator 18 having a dip leg 22 dipping below the level 14 of the catalyst bed 12 for returning catalyst separated by the cyclone separator 18. Ordinarily more than one cyclone separator or the like is used but for purpose of illustration only one is shown in the drawing. The separated hot hydroformate vapors and hydrogen-containing gas pass overhead through line 24 which is shown in the drawing as subdivided into two branch lines 26 and 28. Instead of a single line 24 as shown, the two lines 26 and 28 may lead from the plenum chamber (not shown) directly from the top of reactor 10. Branch line 26 leads through heat exchanger 32 and branch line 28 leads through heat exchanger 34. After the branch lines 26 and 28 pass through heat exchangers 32 and 34, they are reunited into line 36 leading to a polymer or scrubbing tower 38 to fractionate out polymer which is removed through bottom outlet line 42 from the system.

The fractionated hydroformate vapors and hydrogen-containing gas leave the top of fractionating or polymer tower 38 through line 44 and pass through condenser 46 to condense normally liquid hydrocarbons. The condensed liquid and hydrogen-containing gas are passed to a high pressure separator 48 to separate hydrogen and light or normally gaseous hydrocarbons from liquid unstabilized hydroformate or gasoline. The condensed liquid is withdrawn from separator 48 through bottom line 52 and passed to stabilizer 54. The stabilized hydroformate is withdrawn through bottom drawoff line 56 and is a high octane gasoline which has a boiling range between about 120° and 430° F. and which may be used as such without further refining.

A lighter fraction is taken overhead from fractionator or stabilizer 54 through line 58, passed through condenser 62 and the cooled or condensed product is passed to gas-liquid separator 64. The separated liquid is withdrawn from the separator 64 through line 66 and part returned to the top of stabilizer 54 by pump 68 as reflux liquid. Excess liquid or stabilized light ends are removed from the unit through line 69. Tail gas is withdrawn overhead from separator 64 through line 70 and discarded from the system.

Returning now to the high pressure separator 48, the separated gas is removed overhead through line 72 and, if desired or if necessary, some of the gas may be removed from the system through line 74 and the rest recycled to the reactor 10. This gas has a relatively high concentration of hydrogen, as for example 55 to 75 volume percent and may be treated in an absorber (not shown) or the like, to concentrate the hydrogen and the hydrogen recycled to the reactor 10 or it may be used in other hydrogenation processes. As above noted at least part of the hydrogen-containing gas from line 72 is recycled to the reactor 10 through line 76. This gas is first passed through compressor 78 to restore some of the pressure lost by the gas in passing through the unit. The hydrogen-containing gas is preheated by being passed through heat exchanger 32 and then through line 79 and heating coil 80 or the like in furnace 82. The hydrogen-containing gas heated to between about 1050° and 1200° F. is then introduced into the bottom of reactor 10 through line 84.

Fresh naphtha feed is pumped through line 86 by pump 88 and then through heat exchanger 34 to be preheated. The preheated naphtha is then passed through line 89 and heating coil 90 or the like in furnace 82 and the naphtha heated to a temperature between about 900° and 1000° F. is then passed through line 92 into the bottom portion of the reactor 10.

During the hydroforming reaction in reactor 10 some carbonaceous material or coke is laid down on the catalyst and the coked catalyst is passed through stripping section 94 arranged at a lower side of reactor 10 and steam or other stripping gas is introduced into the bottom of the stripping section through line 96. The stripped catalyst is withdrawn from the bottom of the stripping section through line 98 and passed to a regenerator (not shown) where the carbonaceous material is burned off with air. The temperature during regeneration is between about 900° and 1150° F. and the pressure is between about 200 and 1000 p.s.i.g. usually between about 200 and 400 p.s.i.g.

Figure 3:
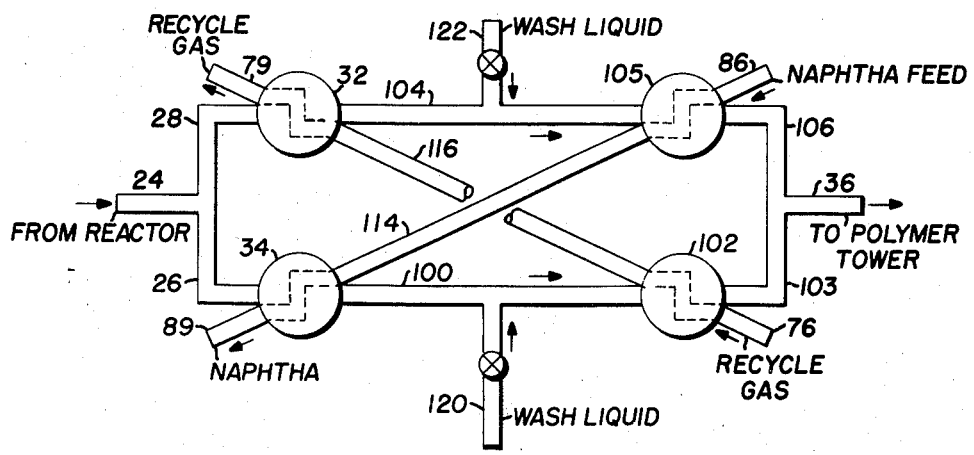
Fig. 3 represents, diagrammatically, the arrangement of the heat exchangers.
Figure 2:
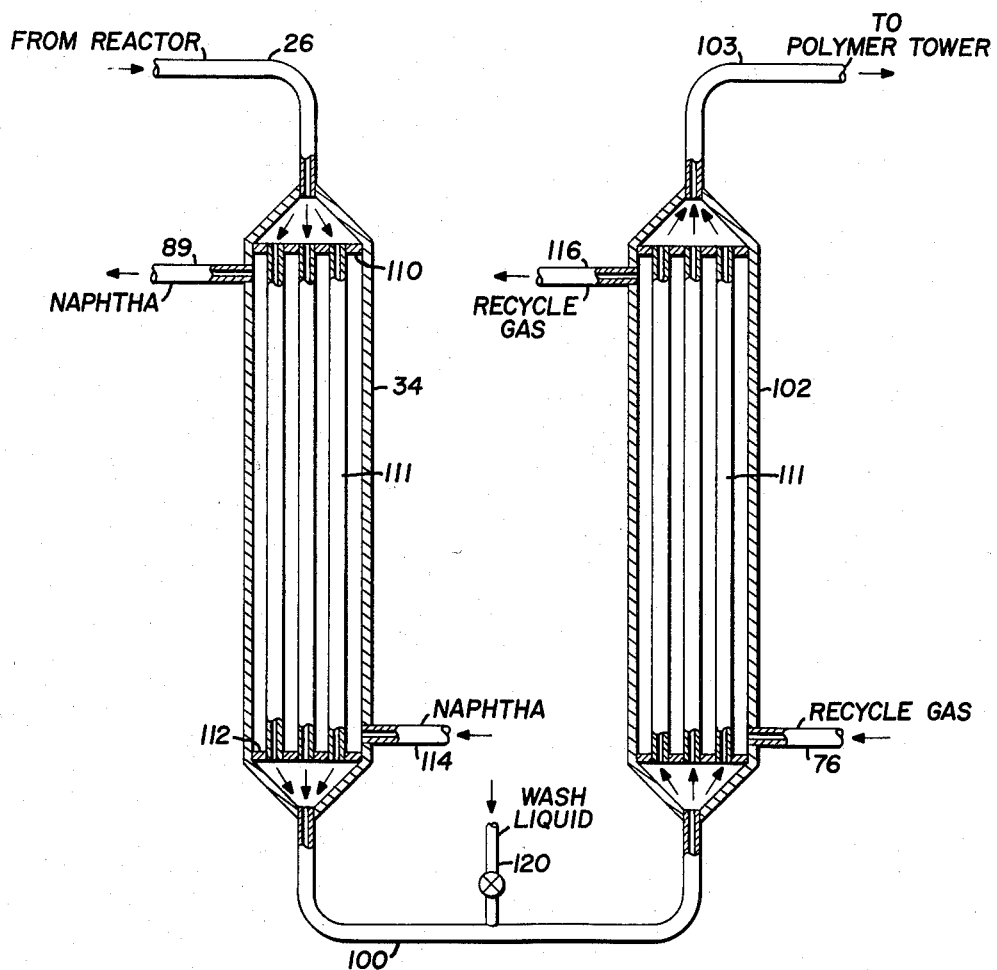
Fig. 2 represents, diagrammatically, flow of gasiform reaction product through two vertical heat exchangers in series.

Referring now to Figs. 2 and 3 of the drawing, it will be seen that there are two heat exchangers used for each stream and as shown in Fig. 3 it will be seen that the recycle gas and the naphtha streams are in crossed relation so that each of the subdivided or branch streams indirectly contacts each of the naphtha and recycle gas streams. In Figs. 2 and 3 it will be seen that branch line 26 leads to one end (top) of the vertically arranged heat exchanger 34 and the line leading from the other (bottom) end of the heat exchanger 34 designated 100 leads to one end (bottom) of another vertically arranged heat exchanger 102 and line 103 leads from the other end (top) of heat exchanger 102 to line 36 leading to polymer tower 38 (Fig. 1). On the other hand, branch line 28 leads to one end of the heat exchanger 32 (like 34 in Fig. 2 but not shown) and line 104 leads from the other end of heat exchanger 32 to one end of another heat exchanger 105 and line 106 leads from the other end of heat exchanger 105 to line 36. Branch line 26 as one stream includes heat exchanger 34, line 100, heat exchanger 102 and line 103. Branch line 28 as the other stream includes heat exchanger 32, line 104, heat exchanger 105 and line 106.

The naphtha to be preheated first passes through line 86 and heat exchanger 105 (Fig. 3 but not shown in Fig. 1) located in branch line stream 28, and then crosses over to heat exchanger 34 in branch line 26 and then out through line 89. The recycle gas to be preheated is first passed through line 76 and heat exchanger 102 (Fig. 3 but not shown in Fig. 1), located in branch line stream 26, and then crosses over to heat exchanger 32 in branch line 28 and leaves through line 79. In Fig. 3, the hot hydroformate vapors or hydroformed products and hydrogen-containing gas pass toward the right from line 24 at the left so that heat exchangers 32 and 34 are the hottest and heat exchangers 102 and 105 at the right are cooler. The hot hydroformate vaporous products pass down through the interior of vertical tubes in the first heat exchanger and up through vertical tubes in the second heat exchanger as shown specifically in Fig. 2.

More specifically, heat exchanger 34 in Fig. 2 has a top header 110, vertical tubes 111 and bottom header 112. The space around the vertical tubes 111 is a heat exchange space. Naphtha from line 86 passes first through heat exchanger 105 then into cross-over line 114 leading to heat exchanger 34 and then out through line 89. The recycle cross-over line is designated 116. As shown in Fig. 2, the first heat exchanger 34 is downflow and the other heat exchanger 102 is upflow, that is, the hydroformate vaporous products pass down through the inside of vertical tubes 111 of first heat exchanger 34 and up through the inside of vertical tubes 111 in second heat exchanger 102. The naphtha to be heat exchanged is introduced through line 114 into the bottom of the heat exchanger 34 and taken off at the top of heat exchanger 34 from the space around the vertical tubes 111 through line 89. A similar arrangement is made for heat exchanger 105. The recycle gas to be preheated is introduced through line 76 into the bottom of heat exchanger 102 around the outside of vertical tubes 111 and withdrawn from the top of the heat exchanger 102 through line 116. A similar arrangement is made for heat exchanger 32.

A hydroforming unit having heat exchangers arranged as shown in the drawings and as above described was put in operation and it was soon observed that poor heat exchange was being obtained in the cooler heat exchangers corresponding to heat exchangers 102 and 105 shown in Fig. 3. Various unsuccessful methods were used in an attempt to improve heat exchange in these heat exchangers. As one solution to the problem, first, naphtha feed was used as a solvent and then instead of feed naphtha, some of the unstabilized hydroformate liquid from line 52 in Fig. 1 was used as a solvent and wash liquid. Sufficient wash liquid such as naphtha feed at a temperature of about 100° F. was introduced through line 120 into line 100 ahead of heat exchanger 102 and through line 122 into line 104 ahead of heat exchanger 105 to cool the heat exchangers 102 and 105 to a small extent so that the solvent or wash liquid contacted the interior of the vertical tube 111 in liquid form to loosen and soften the fouling material to such an extent that the vaporous products passing through the tubes blew the loosened material off the tubes and on through the heat exchangers 102 and 105. The temperature of the wash liquid or solvent to be introduced via lines 120 and 122 may be between about 100° and 450° F. As shown in Fig. 2 the cleansing action takes place as the vaporous products pass up through the vertical tubes 111 in heat exchanger 102. The same action takes place in heat exchanger 105.

The loosened and/or dissolved material is passed along with the vaporous product through line 36 to polymer tower or fractionator 38 and removed as bottoms with the polymer through line 42. The wash liquid is introduced into lines 100 and 104 and the cleansing treatment continued without stopping the hydroforming process.

As a wash liquid or solvent liquid, fresh naphtha feed was also used and found effective but the naphtha put an additional load on the fractionating towers 38 and 54 and separator 48. Also the hydroformate product in line 56 was contaminated with fresh naphtha feed. The unstabilized hydroformate liquid from line 52 is a better solvent than naphtha feed as it contains more aromatic hydrocarbons and is preferred as a solvent liquid over naphtha feed.

It was considered that the fouling material was some sort of a heavy or high boiling polymer and because the polymer withdrawn through line 42 is higher boiling than gasoline and because it has a relatively high aromatic hydrocarbon content, it was selected as a wash or solvent liquid. The polymer proved to be the best solution to the problem. The polymer has the added advantage of being high boiling and being removed in the bottoms from the first fractionating tower 38. Ordinarily the injection or introduction of wash or solvent liquid into lines 100 and 104 is done once every 3 to 12 days and the operation may be carried on for about 30 minutes to 2 hours, preferably 45 minutes to 1 hour, depending on the amount of fouling and the capacity of the unit.

For a 28,000 barrel a day hydroforming unit using heat exchangers, a specific design for the heat exchangers will be given. The heat exchangers 32 and 102 are each about 45 feet long in overall length and the heat exchange tubes are about 35 feet long. Heat exchanger 32 contains 324 heat exchange tubes and heat exchanger 102 contains 331 tubes. The heat exchangers 34 and 105 are each about 55 feet long in overall length and the heat exchange tubes are about 40 feet long. Heat exchanger 34 contains 550 tubes and heat exchanger 105 contains 542 heat exchange tubes. All the heat exchange tubes have an outside diameter of about 1½ inches. The heat exchangers are all about 5 feet in outside diameter. About 35 to 45 barrels of hydroformer polymer is used for about 45 minutes for each heat exchanger 102 and 105 (Fig. 3). The polymer is introduced into lines 100 and 104 from lines 120 and 122, respectively. The temperature of the heat exchangers 102 and 105 is normally about 460° F. at the outlet end and after adding the solvent or polymer liquid, the temperature goes down to about 310° to 320° F. at the outlet end.

In a specific example, in a 28,000 barrel a day unit using a virgin naphtha having an octane number (research) of about 48 and a boiling range of about 200° to 360° F. and containing about 35% naphthenes, 55% paraffins and the rest aromatics was hydroformed at a reactor temperature of about 918° F., a pressure of about 200 p.s.i.g., a w./hr./w. of about 0.615 and a recycle gas rate of about 2885 standard cubic feet per barrel of feed. The hydrogen concentration in the recycle gas was about 65 vol. percent. The naphtha feed is heated to about 1000° F. in coil 90 and the recycle gas is heated to about 1100° F. in coil 80.

The hydroformate products were obtained in 79 vol. percent yield, the octane number (research) was about 87.9 and the product contained about 48 vol. percent aromatics, about 15 vol. percent naphthenes and the rest paraffins. The catalyst was a molybdenum oxide catalyst containing about 10 wt. percent $MoO_3$ on alumina. The polymer withdrawn from the bottom of polymer tower 38 had a boiling range between about 184° and 707° F.

At the beginning of the operation, the temperature of the reactor overhead vaporous products entering the tubes of heat exchangers 32 and 34 was about 883° F. and the temperature of the vaporous reaction products leaving heat exchanger 32 was about 575° F. The temperature of the vaporous reaction products leaving heat exchanger 34 was about 516° F. The temperature of the vaporous reaction products leaving heat exchanger 105 was about 434° F. and the temperature of the vaporous reaction products leaving heat exchanger 102 was about 445° F.

The naphtha feed passing from line 86, through heat exchangers 105 and 34 has its temperature raised from about 320° to about 647° F. The recycle gas from line 76 has its temperature raised from about 245° to about 730° F. in passing through heat exchangers 102 and 32.

After about 32 days' operation, it was noted that the temperature of the vaporous reaction products leaving heat exchanger 102 had dropped from about 445° F. to about 397° F. and the temperature of the reaction vaporous products leaving heat exchanger 105 had risen from about 434° to about 489° F., showing poor distribution of reactor overhead vaporous reaction products in the two lines or circuits 26 and 28 and loss of heat transfer. About 45 barrels of naphtha feed at a temperature of about 100° F. was pumped through line 120 into line 100 ahead of heat exchanger 102 and about 45 barrels of naphtha feed at a temperature of about 100° F. was pumped through line 122 into line 104 ahead of heat exchanger 105. This operation took about 2 hours. The naphtha feed had a boiling range of about 200° to 360° F. The addition or injection of the naphtha feed cooled down the outlet from heat exchangers 102 and 105 from a temperature of about 440° F. down to a temperature of about 320° F. After the introduction of the naphtha feed was stopped and about 24 hours thereafter, the temperatures of the vaporous reaction products leaving heat exchanger 102 and 105 were about 453° F. and 447° F. respectively, showing that they had been lowered to near the original temperatures when the unit was clean and that the flow of reactor overhead vapors through lines 26 and 28 was readjusted approximately to a 50/50 split.

Another way of determining fouling of the tubes of heat exchangers 102 and 105 is to check the pressure drop of the vaporous reaction products passing therethrough. In one case the pressure drop across heat exchangers 102 and 105 at the beginning of the process when the exchangers were clean was about 4 pounds per square inch. After about 32 days' operation the pressure drop across heat exchangers 34 and 102 and 32 and 105 had increased to 8.9 pounds per square inch. After washing with naphtha feed, the pressure drop was reduced to 5.0 lbs./in.$^2$. Intermittent washing of the heat exchangers 102 and 105 with a wash liquid such as naphtha feed or hydroformer polymer or the like reduced this pressure drop from 5.0 to 4.0 lbs./in.$^2$. This intermittent washing was later done at intervals of 3 days for about 45 minutes and for the heat exchangers above described about 45 barrels of naphtha feed or other liquid were used for each exchanger 102 and 105.

After the process had been running for some time and naphtha feed was used intermittently as a wash or solvent liquid, it was decided to try unstabilized hydroformate from line 52 instead of the naphtha feed. The temperature of the unstabilized hydroformate may be between about 85° and 110° F., preferably about 100° F. when it is injected into lines 120 and 122. Here again about 45 barrels of the unstabilized hydroformate was pumped through line 120 and another 45 barrels of the unstabilized hydroformate was pumped through line 122 and the operation took about 2 hours.

Thereafter instead of the unstabilized hydroformate, the hydroformer polymer from line 42 was used. This polymer has a boiling range of about 184° to 707° F. The temperature of the polymer when injected into lines 120 and 122 was about 420° F. About 45 barrels of the polymer liquid were introduced into each of the lines 120 and 122 for about 2 hours. Later on this intermittent washing with the polymer solvent liquid took about 45 minutes and was done about every 3 days but the time and duration of treatment can be varied as conditions require as will be apparent to those skilled in the art.

For other specific operating conditions, the temperature of the reactor overhead vaporous products may be between about 800° and 970° F., the temperature of the vaporous reaction products leaving the outlet end of heat exchanger 102 may be between about 400° and 500° F. at the beginning of the operation and the temperature of the vaporous reaction products leaving the outlet end of heat exchanger 105 may be between about 400° and 500° F. at the beginning of the operation. Then during the operation of the process, fouling of the heat exchangers 102 and 105 occurs and this is observed by a temperature rise in the vaporous reaction products leaving the outlet ends of heat exchangers 102 and 105. Then the selected wash or solvent liquid is introduced into the line leading to the tubes in each heat exchanger 102 and 105 and the temperature of the vaporous reaction products leaving the outlet ends of these heat exchangers is reduced about 100° F. down to between about 300° and 400° F.

The temperature of the vaporous reaction products leaving heat exchanger 34 may be between about 450° and 600° F. and the temperature of the vaporous reaction products leaving heat exchanger 32 may be between about 500° and 625° F. The temperature of the preheated naphtha leaving heat exchanger 34 may have a temperature between about 600° and 750° F. and the recycle gas leaving heat exchanger 32 may have a temperature between about 700° and 850° F.

While the present invention has been described specifically in connection with a fluidized powder hydroforming system, the invention is not to be restricted thereto as it is adapted for use with fixed-bed or moving bed hydroforming processes which use vapor heat exchangers to recover heat from the hydroformate vaporous products by heat exchange with feed naphtha and/or recycle gas, or other processes using vapor heat exchangers where similar fouling conditions appear.

While specific operating conditions of temperature and pressure have been given and specific sizes of heat exchangers for a specific hydroforming unit has been disclosed, it is to be expressly understood that the invention is not restricted thereto and modifications and changes may be made without departing from the spirit of the invention. For different size units different sizes of heat exchangers will be required. The number of heat exchangers may be varied but where an even number of heat exchangers is used, the cross-over arrangement of the streams being preheated is preferred.

What is claimed is:

1. In a hydroforming process wherein naphtha feed is hydroformed in a hydroforming zone and wherein heat exchange zones are provided for indirect heat exchange between hot hydroformate vaporous products and naphtha feed and a hydrogen-containing gas and one of the heat exchange zones becomes fouled after a period of use by materials depositing from the hydroformate vaporous products and thereafter poor heat exchange is obtained and hydroformate vaporous products are fractionated in a fractionating zone to separate polymer liquid as bottoms and an unstabilized hydroformate as an intermediate fraction which is further treated to produce stabilized hydroformate product, the improvement which comprises introducing at intervals a hydrocarbon liquid selected from the group consisting of naphtha feed, unstabilized hydroformate, hydroformate polymer liquid bottoms and hydrocarbon liquid having a boiling point range between about 184° F. and 707° F. and consisting of a mixture of hydrocarbons including aromatic hydrocarbon compounds, into the stream of hot hydroformate vaporous products passing to said fouled heat exchange zone without stopping the hydroforming process and in a sufficient amount to lower the temperature of said heat exchange zone so that said solvent contacts the fouling deposited material as a liquid and softens and loosens the fouling material and continuing the introduction of said hydrocarbon solvent until the fouling material is removed by the continued passage of hot hydroformate vaporous products through said heat exchange zone and into said fractionating zone and then stopping the introduction of said hydrocarbon liquid.

2. In a hydroforming process wherein naphtha feed is hydroformed and wherein heat exchange zones are provided for indirect heat exchange between hot hydroformate vaporous products and naphtha feed and a hydrogen-containing gas and one of the heat exchange zones becomes fouled after a period of used by deposition of fouling material from said hot hydroformate vaporous products and thereafter poor heat exchange is obtained, the improvement which comprises introducing at intervals a hydrocarbon liquid having a boiling point range between about 184° F. and 707° F. and consisting of a mixture of hydrocarbons including aromatic hydrocarbon compounds into the stream of hot hydroformate vaporous products passing to said fouled heat exchange zone without stopping the hydroforming process and in a sufficient amount to lower the temperature of said fouled heat exchange zone so that said hydrocarbon liquid contacts the fouling deposited material as a liquid and softens and loosens the fouling material which is then removed by the continued passage of hot hydroformate vaporous products through said heat exchange zone to a zone for recovery of desired products.

3. A process according to claim 1 wherein the hydroformate vaporous products are passed as two streams after leaving said hydroforming zone and each stream has a plurality of heat exchange zones in series and said naphtha feed is passed through two heat exchange zones in series with one heat exchange zone being arranged in each stream and hydrogen-containing gas is preheated for the hydroforming process by passage through two other heat exchange zones one arranged in each stream so that the streams to be preheated are arranged in cross relation.

4. A process according to claim 1 wherein hydrogen-containing gas is preheated by passage through other heat exchange zones arranged in series and the cooler heat exchanger also becomes fouled and is treated in a manner similar to that defined in claim 1.

5. A process for hydroforming naphthas which comprises passing preheated feed naphtha and preheated hydrogen-containing gas in contact with a hydroforming catalyst in a hydroforming zone maintained under hydroforming conditions, passing the hot gasiform hydroformate products in indirect heat exchange with feed naphtha and hydrogen-containing gas in heat exchange zones to preheat the naphtha and the hydrogen-containing gas for the process and during heat exchange fouling material from said gasiform hydroformate products is deposited on heat exchange surfaces, fractionating said gasiform hydroformate products in a fractionating zone into polymer liquid and high octane gasoline, withdrawing polymer liquid as bottoms, and using at least part of the withdrawn polymer liquid as a wash solvent at intervals only for a time sufficient to clean off the fouling material on said heat exchange zones without stopping the hydroforming process during the cleaning step.

6. A process according to claim 5 wherein the used wash solvent polymer liquid and washed off fouling material are withdrawn from the bottom of said fractionating zone as bottoms.

7. A process as defined in claim 1 wherein said hydrocarbon liquid consists essentially of a high boiling hydroformed hydrocarbon fraction having a relatively high aromatic hydrocarbon content and higher boiling than the hydroformate gasoline produced by the hydroforming process so that following the removal of said fouling material, the said high boiling hydroformed hydrocarbon fraction and said removed fouling material are separated from said hydroformate gasoline in said fractionating tower as a bottoms fraction.

8. A process according to claim 2 wherein the temperature of said fouled heat exchange zone is lowered about 100° F.

9. A process according to claim 1 wherein said hydrocarbon liquid has a relatively high aromatic compound content.

10. An apparatus for carrying out heat exchange between hot vapors and fluids to be heated which includes two substantially parallel lines which have inlet ends and outlet ends, heat exchangers arranged in each line adjacent the inlet and outlet ends of said lines and being provided with tubes for the passage therethrough of fluids from said lines, two conduits arranged in crossed relation and in communication with the space around said tubes of said heat exchangers, each conduit having an inlet end and an outlet end, the conduit outlet ends being arranged adjacent said line inlet ends and the conduit inlet ends being arranged adjacent the line outlet ends, the inlet ends of said conduits being associated with said heat exchangers arranged near the outlet ends of said lines and the outlet ends of said conduits being associated with said heat exchangers arranged near the inlet ends of said lines whereby separate fluid streams are passed through said crossed conduits and said heat exchangers and each fluid stream indirectly contacts hot vapors in both lines and each fluid stream first indirectly contacts the hot vapors passing through the heat exchanger in its respective line and then passes through the heat exchanger in the other line and an additional line arranged between said heat exchangers and communicating with each of said substantially parallel lines for introducing fluid into said lines.

11. A process according to claim 5 wherein a sufficient amount of withdrawn polymer liquid is introduced into the gasiform hydroformate products to contact the fouling material as a liquid to soften and loosen the fouling material.

References Cited in the file of this patent
UNITED STATES PATENTS

| | | |
|---|---|---|
| 2,087,540 | Guyer | July 20, 1937 |
| 2,270,027 | Alther | Jan. 13, 1942 |
| 2,380,340 | Simpson | July 10, 1945 |
| 2,429,115 | Atkins | Oct. 14, 1947 |
| 2,723,948 | McCurdy | Nov. 15, 1955 |
| 2,758,068 | Howard | Aug. 7, 1956 |
| 2,768,934 | Schapiro et al. | Oct. 30, 1956 |
| 2,797,189 | Virgil | June 25, 1957 |